No. 677,742.  
J. C. HOSHOR.  
CONVEYER CHAIN.  
(Application filed Jan. 16, 1901.)
Patented July 2, 1901.
(No Model.)
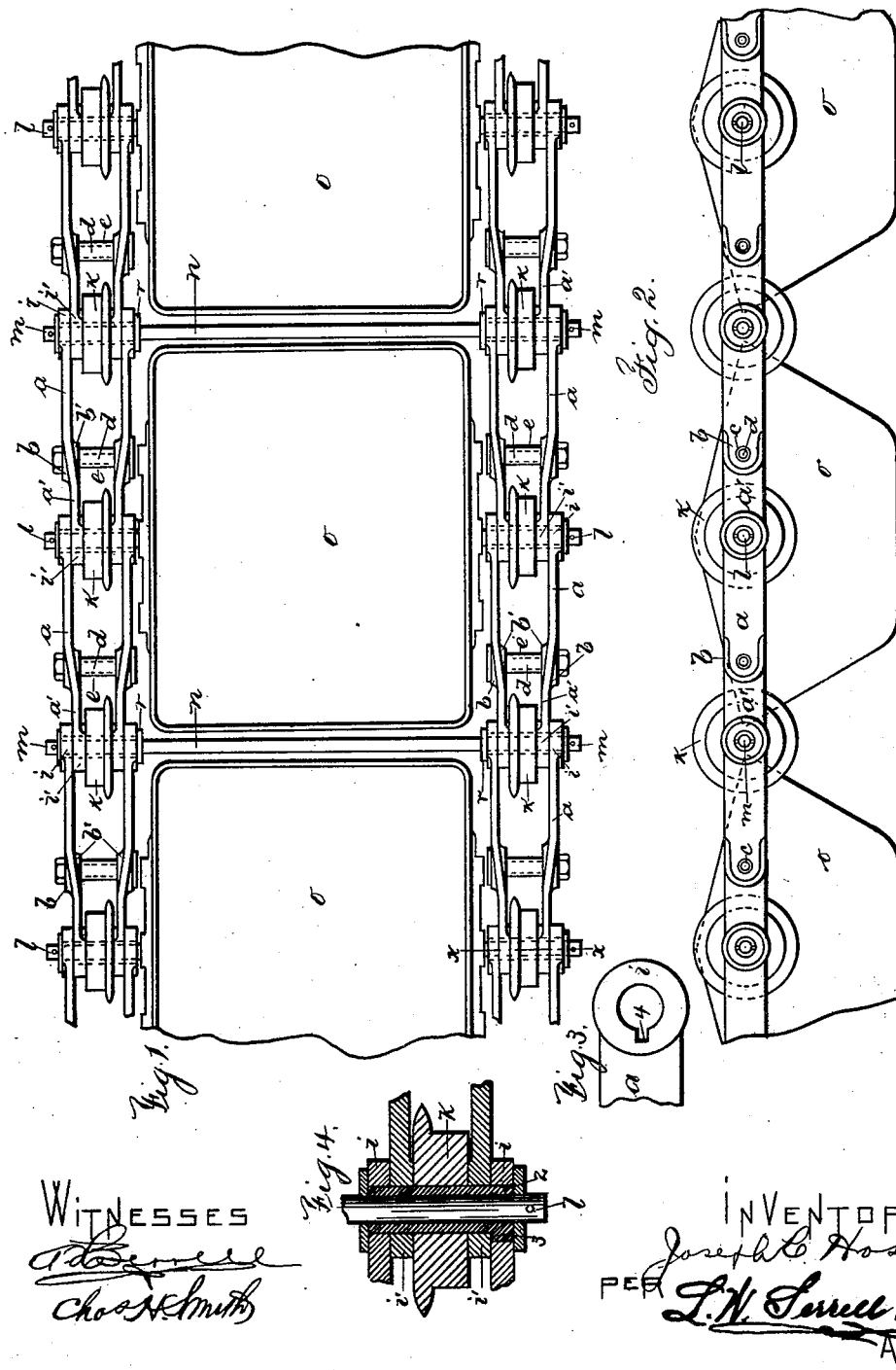

UNITED STATES PATENT OFFICE.

JOSEPH C. HOSHOR, OF PATERSON, NEW JERSEY, ASSIGNOR TO HIMSELF AND THOMAS E. PLATT, OF SAME PLACE.

CONVEYER-CHAIN.

SPECIFICATION forming part of Letters Patent No. 677,742, dated July 2, 1901.

Application filed January 16, 1901. Serial No. 43,493. (No model.)

*To all whom it may concern:*

Be it known that I, JOSEPH C. HOSHOR, a citizen of the United States, residing at Paterson, in the county of Passaic and State of New Jersey, have invented an Improvement in Conveyer-Chains, of which the following is a specification.

In conveyers for coal, ore, and other substances the gravity-buckets are commonly pivoted to endless chains, having rollers running upon tracks, whereby the substances to be conveyed may be carried either through vertical or horizontal planes or up or down grade. Such endless chains have heretofore commonly consisted of inner and outer pairs of connected links. Conveyer-chains have also comprised offset links, all of said links to a given chain being alike, but not connected in pairs. With this kind of chain it is common to suspend the conveyer-bucket from one side of one of the offset links. In my present improvement I employ offset links strengthened by bosses on both the outside and inside at the offset portion. At said strengthened portions I provide bolt-holes, bolts, and sleeves passing over said bolts between the links of each pair, whereby by drawing up the nuts of said bolts the links of each pair are independently and securely held together. The offset parts of each link are in parallel planes and terminate in enlarged eye-heads for the pivot-pins for the rollers. Preferably I employ four times as many rollers as conveyer-buckets. The eye-heads that are nearest together of each pair of links are received between the eye-heads that are farthest apart of each adjacent pair of links, and the rollers are in all cases between the eye-heads that are nearest together and upon the pins or shafts connecting the links. The pivot-pins of alternate rollers support the gravity-buckets, the pivots of the intermediate rollers being the ends of cross-shafts. Between the pivot-pins and the eyes in the heads of the links I provide a bushing having a lug on one end which fits into a recess in the outside link, whereby the wear is divided between the link, the bushing, and the pivot-pin, which will be hereinafter more particularly described.

Referring to the drawings, Figure 1 is a plan view of my improvement, and Fig. 2 is an elevation of the same. Fig. 3 is an enlarged elevation of the end of a link, showing the recess in the eye; and Fig. 4 is an enlarged section on the line $x$ $x$, Fig. 1.

$a$ and $a'$ represent the respective offset portions of each integral link. At the offsetting portion the link is strengthened by the parts $b$ and $b'$, the one on the outside and the other on the inside of the link together forming a hub or bearing. This portion of the link is provided with a bolt-hole $c$. A bolt $d$ is passed through the holes $c$ in each pair of links, and a sleeve $e$, fitting over said bolt, extends between the links, the inside bosses of the links forming shoulders for the said sleeve $e$. It is evident that by drawing up the bolt $d$ each pair of links is independently secured together.

The offset portions $a$ and $a'$ of each link are in parallel planes and terminate in the enlarged eye ends $i$ and $i'$. The portions $a'$ of any pair of links are offset sufficiently to allow the eye ends $i'$ of said portions to fit between the eye ends $i$ of the portions $a$ of the next pair of links when the links have been secured in pairs.

Preferably I employ four times as many rollers $k$ as conveyer-buckets $o$. The rollers $k$ fit between the eye ends $i'$. Pivot-pins pass through said rollers and the eye ends $i$ $i'$ of adjacent pairs of links. Alternate pivot-pins $l$ form the supports for the conveyer-buckets $o$, the intermediate pivots $m$ being the ends of cross-shafts $n$. These cross-shafts are provided with shoulders or collars $r$, spaced at the proper distance to bear upon the eye ends $i$ to insure keeping the chain in line.

Referring to Fig. 4, the eyes in the enlarged ends of the links are of sufficient diameter to allow for a bushing 2 to be inserted between the pivot-pins and the bearing-surfaces of said eyes. This bushing extends through the roller to the greatest width of the connected links. At the outer end of the bushing I provide a lug 3 integral therewith. In the outside eye of the outside link of every pair of links there is a groove or recess 4, (see Fig. 3,) into which the lug 3 of the bushing fits and acts as a key. By this construction one end of every pair of links is secured together over the pivot-pin, so that the motion of the ends of the next adjacent link is between those ends and over the bushing and not between the ends and the pivot-pin, in this way dividing the wear between the link end, the bushings, and the pivot-pins.

I claim as my invention—

1. The combination with a series of gravity-buckets, of conveyer-chains each comprising oppositely-placed similar offset links in pairs having eyes at the ends for pivot-pins with the eyes at one end of each pair passing between the eyes at one end of the adjacent pair, rollers between said eyes, pivot-pins passing through said rollers and said eyes, intermediate hubs, sleeves between the hubs and bolts passing through the hubs and sleeves to connect the links in pairs, substantially as specified.

2. The combination with a series of gravity-buckets of conveyer-chains each comprising oppositely-placed similar offset links in pairs having eyes at the ends for connecting-shafts, with the eyes at the end of each pair passing between the eyes at the end of the adjacent pair, intermediate hubs, sleeves between the hubs and bolts passing through the hubs and sleeves to connect the links in pairs, substantially as specified.

3. The combination with a series of gravity-buckets, of conveyer-chains each comprising similar pairs of oppositely-placed links having eyes at the ends and means for connecting the links in pairs, the eyes at one end of each pair passing between the eyes at the end of the next adjacent pair of links, of rollers between the eyes, pivot-pins passing through said rollers and the eyes in the ends of the links, bushings over said pivot-pins and between the same and the bearing-surfaces of said eyes, and means whereby one end of every pair of links and a bushing are connected to move together, the adjacent ends of the next pair of links being free to move on said bushings, substantially as and for the purposes set forth.

4. The combination with a series of gravity-buckets, of conveyer-chains each comprising similar pairs of oppositely-placed links having eyes at the ends and means for connecting the links in pairs, the eyes at one end of each pair passing between the eyes at the end of the next adjacent pair of links, of rollers between the eyes, pivot-pins passing through said rollers and the eyes in the ends of the links, bushings over said pivot-pins, and between the same and the bearing-surfaces of said eyes, each of said bushings having a lug on one end fitting into a groove in the bearing-surface of one eye in the outside link of a pair, whereby one end of each pair of links and a bushing are connected to move together over the pivot-pin, the ends of the next adjacent pair of links being free to move on the bushing, substantially as specified.

Signed by me this 12th day of January, 1901.

JOSEPH C. HOSHOR.

Witnesses:
GEO. T. PINCKNEY,
S. T. HAVILAND.